United States Patent [19]

Pralutsky

[11] 4,089,537
[45] May 16, 1978

[54] SPLASH SHIELD

[76] Inventor: James J. Pralutsky, 836 Englewood, St. Paul, Minn. 55104

[21] Appl. No.: 693,011

[22] Filed: Jun. 4, 1976

[51] Int. Cl.² .......................................... B62D 25/16
[52] U.S. Cl. ............................. 280/154.5 R; 428/31; 428/80; 428/81; 428/137; 428/192
[58] Field of Search ................. 280/154.5 R, 154.5 A; 428/31, 80, 81, 137, 187, 203, 192, 204, 213–216, 206–208

[56] References Cited

U.S. PATENT DOCUMENTS

| | | | |
|---|---|---|---|
| 2,987,103 | 6/1961 | Yakubik | 428/203 |
| 3,118,781 | 1/1964 | Downing | 428/458 |
| 3,237,963 | 3/1966 | Menzer | 280/154.5 R |
| 3,322,609 | 3/1967 | Vida | 428/156 |
| 3,497,238 | 2/1970 | Carlton | 280/154.5 R |
| 3,502,540 | 3/1970 | Pietrocola | 428/203 |
| 3,582,108 | 6/1971 | Carlton | 280/154.5 R |

FOREIGN PATENT DOCUMENTS

| | | | |
|---|---|---|---|
| 807,479 | 1/1959 | United Kingdom | 280/154.5 |
| 1,294,606 | 11/1972 | United Kingdom | 428/315 |

Primary Examiner—William J. Van Balen
Attorney, Agent, or Firm—Burd, Braddock & Bartz

[57] ABSTRACT

A splash shield or flap structure adapted to be attached to a portion of a wheeled vehicle to intercept and deflect liquid and foreign particles, as water and mud. The shield is a flat laminated sheet member having a linear side, a convex curved side and a linear bottom edge. The sheet member has a flat, flexible base. A transparent plastic sheet material covers one surface of the base. An adhesive having colored metal particles suspended therein secures the transparent plastic sheet material to the base so that the colored metal particles are visible through the transparent plastic sheet material.

10 Claims, 6 Drawing Figures

U.S. Patent     May 16, 1978     4,089,537
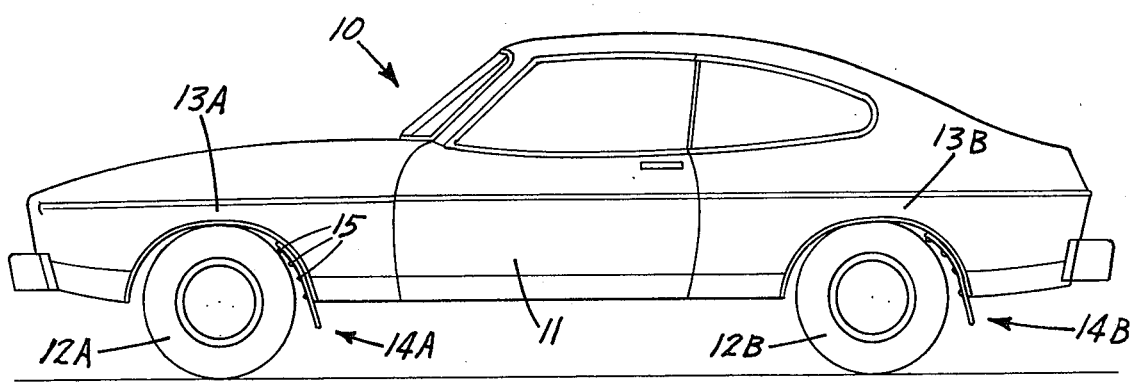
*Fig. 1*
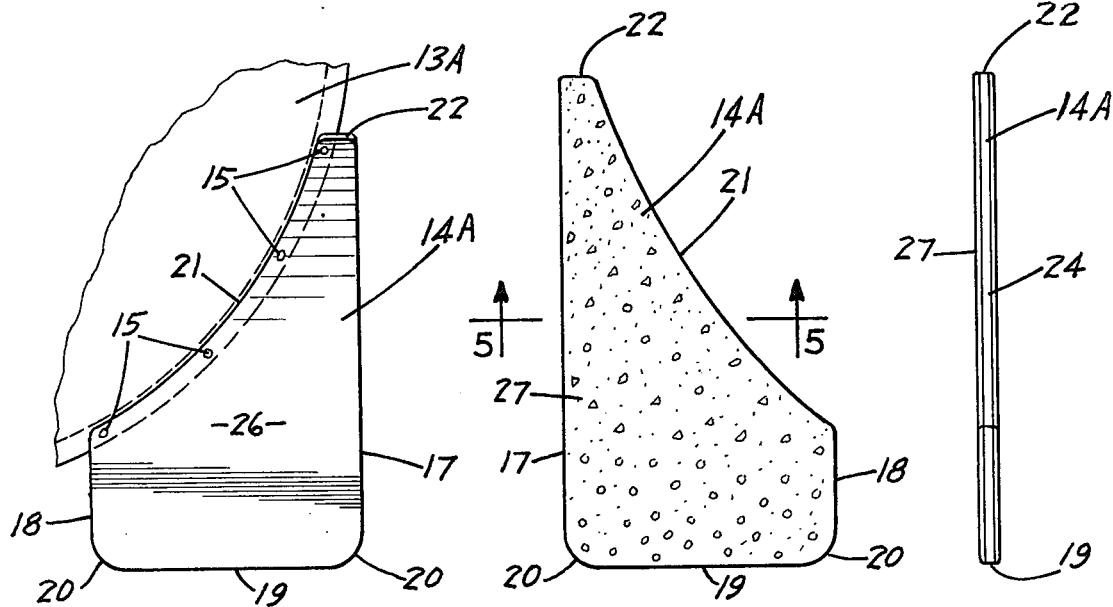
*Fig. 2*     *Fig. 3*     *Fig. 4*
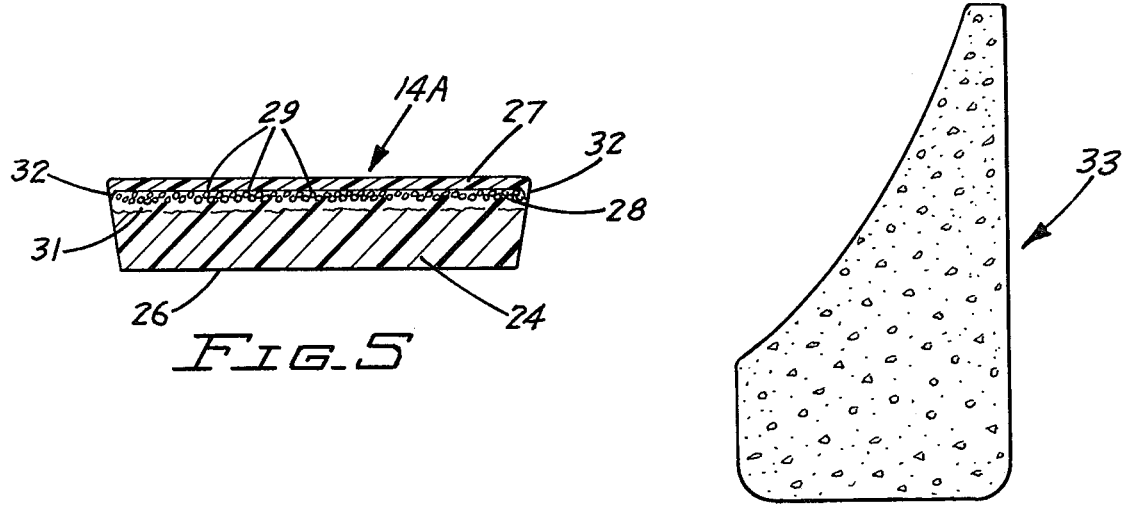
*Fig. 5*     *Fig. 6*

SPLASH SHIELD

BACKGROUND OF INVENTION

Fenders and mud flaps attached thereto have been used with vehicles, as wagons, horse drawn carriages, automobiles, trucks, motor homes and the like. The mud flaps, known as splash shields, are attached to a portion of the vehicle behind the wheels. Usually, the splash shields are attached to a part of the fender and project downwardly from the fender toward the road surface. In recent years, splash shields have become a custom product comprising a sheet of aluminum or stainless steel. A rubber or flexible plastic member is attached with rivets to the inside surface of the metal sheet so that foreign material, as stones, mud, water and the like, which is picked up by the wheel will strike the noise attenuating rubber surface of the splash shield. In use, the rubber layer tends to deteriorate and is damaged by repetitive impact of the rocks and particles. Also, the metal sheet member, being rigid, will bend when it engages an obstruction, such as a curb or the road surface.

SUMMARY OF INVENTION

The invention is directed to a splash shield for use with a wheeled vehicle to protect the body of the vehicle behind the rotating wheels. More particularly, the splash shield of the invention is a laminated sheet member having a first linear outside edge, a transverse linear bottom edge, and a second inside edge. The second inside edge has a linear bottom portion and a concave curved upper portion adapted to generally follow the contour of the body of an automobile immediately behind either the front or rear wheels. The sheet member has a flat flexible base. Preferably, the base is a flexible plastic material. Transparent sheet means covers the top surface of the base. Adhesive material secures the sheet means to the base. Colored particulates, as metal particles, are suspended in the adhesive material. The colored particulates are visible through the transparent sheet means.

An object of the invention is to provide a splash shield for a wheeled vehicle that is mountable on the body of the vehicle behind either the front or rear wheels to protect the body of the vehicle from foreign objects as well as water, ice and snow. Another object of the invention is to provide a laminated splash shield that has a light reflective outside surface which has a colored visual appeal. A further object of the invention is to provide a splash shield that has colored metal particles suspended in an adhesive material used to secure a transparent outer protective sheet member to a base member. Yet another object of the invention is to provide a one-piece splash shield of a laminated structure that is flexible, relatively low-cost and readily mounted on a wheeled vehicle. These and other objects and advantages of the invention are apparent from the following description of the splash shield of the invention.

IN THE DRAWINGS

FIG. 1 is a side view of a wheeled vehicle showing the splash shield of the invention secured to the body of the vehicle behind the front and rear wheels;

FIG. 2 is an enlarged sectional view taken along line 2—2 of FIG. 1;

FIG. 3 is an enlarged rear elevational view of the front splash shield of FIG. 1 in its flat position;

FIG. 4 is a side elevational view of the right side of FIG. 3;

FIG. 5 is an enlarged sectional view taken along the line 5—5 of FIG. 3; and

FIG. 6 is an outside elevational view of a modified splash shield of the invention.

DESCRIPTION OF PREFERRED EMBODIMENT

Referring to FIG. 1, there is shown a side view of a motor vehicle indicated generally at 10. Vehicle 10 is illustrated as a two-door sedan automobile. Other types of vehicles, as trailers, trucks, motor homes and snowmobiles can be equipped with the splash shields of the invention. Vehicle 10 has a body 11 located adjacent a front ground engaging wheel 12A and a rear drive wheel 12B. The body 11 extends over the top of the wheels 12A and 12B to form fenders 13A and 13B. The splash shield of the invention indicated generally at 14A is attached to a lower rear portion of fender 13A with conventional means 15, such as nuts, bolts and screws. The fastening means 15 extend through portions of the shield 14A and are attached to the 13A. A lower section of the shield 14A extends below the body and an outside portion of the shield projects laterally outwardly from the fender 13A so as to intercept and deflect any foreign material, as rocks, sand, dust, mud, snow, ice and water, that is picked up by the wheel 12A and propelled in a rearward direction. A second shield 14B is attached to the body behind wheel 12B. The opposite side of the vehicle has two shields attached to the body. These shields have the shape of the shield shown in FIG. 6.

Conventional automobiles are not initially equipped with splash shields. Foreign material, particularly rocks and sand, will mar the finish of an automobile body behind the wheels. Also, tar and mud are picked up by the wheels and deposited on the sides of the automobile body. The splash shield of the invention obviates the damage caused to the body 11 by the foreign matter picked up by the wheels.

Referring to FIGS. 2 and 3, the splash shield 14A is a laminated sheet member having a first linear outer edge 17 and second side 18 and 21 connected with a transverse linear bottom 19 and a short linear transverse top 22. The lower corners 20 of the shield are rounded to eliminate sharp edges. The side 18 and 21 is divided into a first linear lower section 18 and an upper concave curved section 21. The curvature of section 21 generally follows the curvature of the lower rear portion of the fender 13A of vehicle 10.

In one form of the invention, the splash shield has the following dimensions. The laminated sheet member 14A is approximately 2 cm. thick. The side 17 has a length of 33 cm. Bottom 19 has a length of 18.5 cm. Side section 18 has a length of 9 cm. The arcuate length of side section 21 is 30 cm. The radius of curvature of section 21 is 712 cm. The top end 22 is 2.5 cm. Other sizes and shapes of the splash shield can be provided and are within the scope of the invention disclosed and claimed herein.

Referring to FIG. 5, the splash shield 14A has a flat flexible base 24 having a flat bottom or inside surface 26. The base is a flexible plastic material such as ABS sheet material and "Royalite" ABS sheet made by Uniroyal, Inc. Base 24 is tough, impact resistant material which resists weathering and seasonal temperature changes. The top or outer surface of base 24 is covered with a transparent sheet member or layer 27. The layer 27 is a tough, clear, flexible plastic such as "Mylar" film having a thickness of 1.5 mil. Other types of transparent materials can be used for the layer 27. The entire inside surface of layer 27 is secured to the adjacent surface of the base 24 with an adhesive material 28. Evenly suspended in the adhesive material are colored metal particles 29 which provide a metallic appearance. The upper surface of the base 24 has an adhesion layer 31 formed by a treatment of the top surface of base 24 with a solvent such as methyl ethyl ketone prior to application of the adhesive material 28 to the base 24.

The transparent layer 27, the adhesive material 28, and the base 24 are laminated in a press with the application of heat. During the laminating process, the heat and pressure set the adhesive material 28 and bond the transparent layer 27 to the base 24. The metal particles 29 are clearly visible through the transparent layer 27 to provide the splash shield with an attractive appearance. The outside edges 32 of the transparent layer 27 are rounded over the adjacent portions of the base to eliminate sharp cutting edges. The sides 17, 18, 19, 21 and 22 are outwardly tapered from the surface 26, as shown in FIG. 5. The colored particles 29 suspended in the adhesive 28 can be a variety of colors designed to match or add contrast to the color of the vehicle. These colors can be a range of the color spectrum and be a combination of colors, such as black and white.

Referring to FIG. 6, there is shown a modification of the splash shield of the invention indicated generally at 33. Shield 33 is a mirror image of FIG. 3. Shield 33 is adapted to be mounted on the right side of the body of a vehicle behind the wheels. The shield 14A of FIG. 3 is adapted to be mounted on the left side of the vehicle behind the wheels. The structure and shape of the splash shield 33 is identical to the splash shield shown in FIGS. 2-5, except that side 17 and side sections 18 and 21 are on opposite sides of the shield.

While there have been shown and described preferred embodiments of the invention, it is understood that changes in the structure, shape and form of the splash shield can be made by those skilled in the art without departing from the spirit of the invention.

The embodiments of the invention in which an exclusive property or privilege is claimed are defined as follows:

1. A splash shield comprising: a laminated sheet member having a first linear side edge, a second side edge having a linear portion and a concave portion, a top, and a bottom, said sheet member having a flat and flexible base with a top surface, transparent sheet means covering said top surface adhesive material securing said sheet means to the top surface of the base, and colored particles evenly suspended in said adhesive material, said colored particles being visible through said transparent sheet means.

2. The shield of claim 1 wherein: the base is a flexible plastic member.

3. The shield of claim 1 wherein: the transparent sheet means is a transparent flexible plastic material.

4. The shield of claim 1 wherein: the colored particles are metal particles.

5. The shield of claim 1 wherein: the adhesive material is a transparent plastic material.

6. The shield of claim 1 wherein: the transparent sheet means has edges turned down onto the adjacent edges of the base.

7. The shield of claim 1 wherein: the color particles are colored metal particles evenly suspended in the adhesive material, said adhesive material being a transparent plastic material.

8. The shield of claim 1 wherein: the base comprises a flexible plastic material, said transparent sheet means comprises transparent flexible plastic material, said colored particles comprises colored metal particles evenly suspended in the adhesive material, and said base having an upper surface provided with an adhesion layer coacting with the adhesive material.

9. The shield of claim 8 wherein: the base comprises ABS plastic sheet material.

10. The shield of claim 8 wherein: the transparent sheet means has edges turned down onto the adjacent edges of the base.